US006978545B2

(12) United States Patent
Marando (10) Patent No.: US 6,978,545 B2
(45) Date of Patent: *Dec. 27, 2005

(54) METHOD OF MANUFACTURING A VEHICLE BODY AND FRAME ASSEMBLY

(75) Inventor: Richard A. Marando, Mohrsville, PA (US)

(73) Assignee: Dana Corporation, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/765,814

(22) Filed: Jan. 27, 2004

(65) Prior Publication Data

US 2004/0181942 A1 Sep. 23, 2004

Related U.S. Application Data

(63) Continuation of application No. 10/116,673, filed on Apr. 4, 2002, now Pat. No. 6,681,488.

(60) Provisional application No. 60/282,324, filed on Apr. 6, 2001.

(51) Int. Cl.[7] .............................................. B21D 53/88
(52) U.S. Cl. ........................ 29/897.2; 29/412; 29/416; 29/421.1
(58) Field of Search ............................... 29/897.2, 412, 29/416, 421.1, 415, 425, 463, 414, 890.054, 29/890.053, 417; 72/62, 58, 61; 228/173.4

(56) References Cited

U.S. PATENT DOCUMENTS

| | | |
|---|---|---|
| 1,719,169 A | 7/1929 | Clulee |
| 2,228,132 A | 1/1941 | Werner |
| 3,979,809 A | 9/1976 | Schneider |
| 4,028,796 A | 6/1977 | Bergstrom |
| 4,590,652 A | 5/1986 | Harwood |
| 5,093,990 A | 3/1992 | Klippel |
| 5,261,159 A | 11/1993 | Yasuda et al. |
| 5,277,469 A | 1/1994 | Klippel |
| 5,333,775 A | 8/1994 | Bruggemann et al. |
| 5,491,883 A | 2/1996 | Marlinga |
| 5,557,961 A | 9/1996 | Ni et al. |
| 5,561,902 A * | 10/1996 | Jacobs et al. ............... 29/897.2 |
| 5,718,048 A | 2/1998 | Horton et al. |
| 5,735,156 A | 4/1998 | Yoshitomi et al. |
| 5,813,105 A | 9/1998 | Littecke et al. |
| 5,855,394 A | 1/1999 | Horton et al. |
| 6,010,155 A | 1/2000 | Rinehart |
| 6,138,358 A | 10/2000 | Marando |

FOREIGN PATENT DOCUMENTS

EP 930109 7/1999

* cited by examiner

Primary Examiner—John C. Hong
(74) Attorney, Agent, or Firm—MacMillan, Sobanski & Todd, LLC

(57) ABSTRACT

A vehicle frame assembly includes a first vehicle frame component that is formed by deforming a closed channel structural member to have a relatively small end portion and a relatively large end portion. A member is provided having first and second ends. The relatively large end portion of the closed channel structural member is secured to the first end portion of the member to form the first vehicle frame component. A plurality of second vehicle frame components are provided. The first vehicle frame component and the plurality of second vehicle frame components are secured together to form the vehicle frame assembly.

5 Claims, 7 Drawing Sheets

METHOD OF MANUFACTURING A VEHICLE BODY AND FRAME ASSEMBLY

CROSS REFERENCE TO RELATED APPLICATIONS

This application is a continuation of Ser. No. 10/116,673, filed Apr. 4, 2002, now U.S. Pat. No. 6,681,488, issued Jan. 27, 2004, which claimed the benefit of U.S. Provisional Application No. 60/282,324, filed Apr. 6, 2001, the disclosure of both of which are incorporated herein by reference.

BACKGROUND OF THE INVENTION

This invention relates in general to methods for manufacturing body and frame assemblies for vehicles. More specifically, this invention relates to an improved method for manufacturing a vehicular body and frame assembly including a pair of side rails, wherein each of the side rails has a central portion that is enlarged relative to the ends portions thereof.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

One well known example of a separate type of vehicular body and frame assembly is commonly referred to as a ladder frame assembly. A ladder frame assembly includes a pair of longitudinally extending side rails that are joined together by a plurality of transversely extending cross members. The cross members connect the two side rails together and provide desirable lateral, vertical, and torsional stiffness to the ladder frame assembly. The cross members can also be used to provide support for various components of the vehicle. Depending upon the overall length of the vehicle and other factors, the side rails of a conventional ladder frame assembly may be formed either from a single, relatively long structural member or from a plurality of individual, relatively short structural members that are secured together. For example, in vehicles having a relatively short overall length, it is known to form each of the side rails from a single integral structural member that extends the entire length of the vehicle body and frame assembly. In vehicles having a relatively long overall length, it is known to form each of the side rails from two or more individual structural members that are secured together, such as by welding, to provide a unitary structural member that extends the entire length of the vehicle body and frame assembly.

Traditionally, the side rails of known vehicle body and frame assemblies have been formed exclusively from open channel structural members, i.e., structural members that have a non-continuous cross sectional shape (U-shaped or C-shaped channel members, for example). Thus, it is known to use a single integral open channel structural member to form a side rail that extends the entire length of the vehicle body and frame assembly, as described above. Additionally, it is known to secure a plurality of such open channel structural members together to form the individual sections of a unitary side rail for a vehicle body and frame assembly, as also described above. However, the use of open channel structural members to form the side rails and cross members for vehicle body and frame assemblies has been found to be undesirable for several reasons. First, it is relatively time consuming and expensive to bend multiple portions of the side rails to conform to a desired final shape, as is commonly necessary. Second, after such bending has been performed, a relatively large number of brackets or other mounting devices must usually be secured to each of the side rails to facilitate the attachment of the various components of the vehicle to the body and frame assembly. Third, in those instances where the side rails are formed from a plurality of individual sections, it has been found difficult to maintain dimensional stability throughout the length of the side rail when the individual side rail sections are secured together.

More recently, it has been proposed to form the side rails and the cross members from closed channel structural members, i.e., structural members that have a continuous cross sectional shape (tubular or box-shaped channel members, for example). In vehicle body and frame assemblies of this type, it is known that the closed channel structural member may be deformed to a desired shape by hydroforming. Hydroforming is a well known process that uses pressurized fluid to deform a closed channel structural member into a desired shape. To accomplish this, the closed channel structural member is initially disposed between two die sections of a hydroforming apparatus that, when closed together, define a die cavity having a desired final shape. Thereafter, the closed channel structural member is filled with a pressurized fluid, typically a relatively incompressible liquid such as water. The pressure of the fluid is increased to a magnitude where the closed channel structural member is expanded or otherwise deformed outwardly into conformance with the die cavity. As a result, the closed channel structural member is deformed into the desired final shape.

Hydroforming has been found to be a desirable forming process because portions of a closed channel structural member can be quickly and easily deformed to have a complex cross sectional shape. In those instances where the perimeter of the closed channel structural member is essential the same as the perimeter of the die cavity, the cross sectional shape of the closed channel structural member is changed during the hydroforming process. However, at least ideally, the wall thickness of the closed channel structural member should remain relatively constant throughout the deformed region. Hydroforming has also been found to be a desirable forming process because portions of a closed channel structural member can be quickly and easily expanded from a relatively small perimeter to a relatively large perimeter. In those instances where the perimeter of the closed channel structural member is somewhat smaller than the perimeter of the die cavity, not only is the cross sectional shape of the closed channel structural member changed during the hydroforming process, but the wall thickness thereof is decreased. However, at least ideally, the wall thickness of the closed channel structural member should decrease uniformly through the expanded region.

Such variations in the wall thickness of the closed channel structural member are usually considered to be undesirable because they can result in undesirable weaknesses in the formed closed channel structural member. One solution is to increase the wall thickness of the entire closed channel structural member such that the most extreme reductions in the wall thickness thereof would not adversely affect the overall strength of the member for its intended use. However, such over-designing undesirably increases the overall weight and cost of the closed channel structural member and the resultant vehicle frame component. An alternative solution is to employ a process known as end feeding. End feeding involves applying a mechanical force against one or both end portions of the closed channel structural member simultaneously as the interior portion is expanded. As a result, some of the metallic material of the end portions flows into the interior portion being expanded, thus minimizing the reduction in the wall thickness thereof. End feeding has been found to function satisfactorily in many instances, particularly when the interior portion being expanded is located relatively near to the ends portions, when the overall length of the closed channel structural member is relatively short, and when the shape of the closed channel structural member is relatively straight. This is because the end feeding process is somewhat limited in its ability to cause the metallic material of the end portions of the closed channel structural member to flow into the expanded interior portion.

Unfortunately, it has been found that the side rails and other components of some vehicle body and frame assemblies sufficiently long or complex in shape as to render the end feeding process ineffective to minimize the undesirable reduction in the wall thickness when the interior portion of the closed channel structural member is expanded during hydroforming. In many instances, it is desirable to expand one or more interior portions of the side rail to provide a desired magnitude of stiffness, especially when the side rail is relatively long, and the distance between the front and rear axles is relatively large. Thus, it would be desirable to provide an improved method for hydroforming a relatively long or complex shaped closed channel structural member that facilitates the use of the end feeding process to minimize the reduction in the wall thickness during expansion.

SUMMARY OF THE INVENTION

This invention relates to an improved method for forming a closed channel structural member for use in a vehicle frame assembly. In a first embodiment, a tube is formed in a hydroforming die to have a desired shape that is preferably characterized by a relatively small dimension central portion extending between a pair of relatively large dimension end portions. Next, the tube is divided into two pieces in any conventional manner, such as by cutting, to provide two tube sections. Each of the two tube sections is then oriented in the opposite direction such that the relatively large end portions of the tube are oriented facing one another. An intermediate member is disposed between the relatively large end portions of the tube. Lastly, the relatively large end portions of the two tube sections are joined to the ends of the intermediate member in any conventional manner, such as by butt welding, to form a unitary member characterized by a relatively large dimension central portion extending between a pair of relatively small dimension end portions. In a second embodiment of this invention, a tube is formed in a hydroforming die to have a desired shape that is preferably characterized by a relatively small dimension central portion extending between a pair of relatively large dimension end portions. Next, the tube is divided into two pieces in any conventional manner, such as by cutting, to provide two tube sections, each having a relatively large end portion and a relative small end portion. A side rail section is secured to the relatively large end portions of the two tube sections in any conventional manner, such as by butt welding, to form a pair of unitary members. The unitary members can be used as components, such as the side rails, of a vehicle body and frame assembly.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
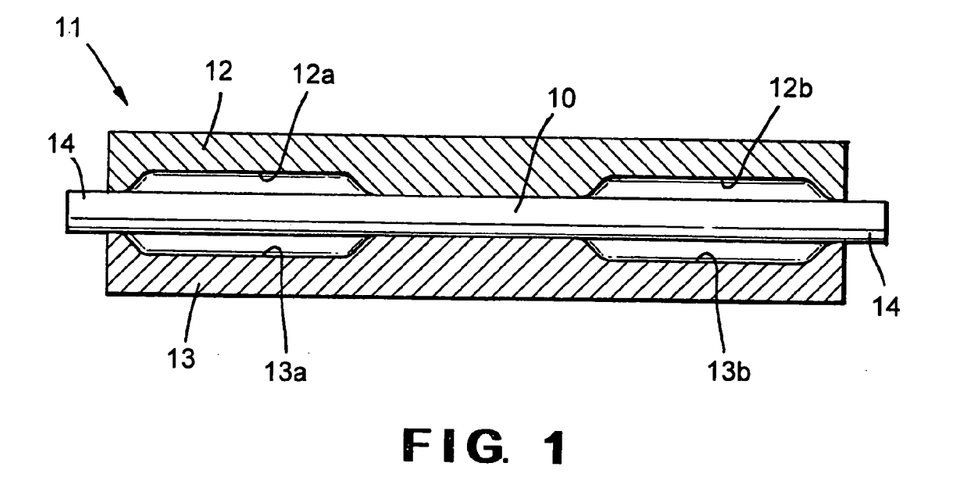
FIG. 1 is a sectional elevational view of a closed channel structural member disposed within a hydroforming die prior to the commencement of a hydroforming operation in accordance with a first embodiment of the method of this invention.

Referring now to the drawings, there is illustrated in FIG. 1 a closed channel structural member, such as a tube 10, that can be used in conjunction with a first embodiment of the method of this invention to form a vehicle frame component or other desired article. The tube 10 is conventional in the art and is preferably formed having a uniform wall thickness through the length thereof. The tube 10 is disposed within a forming die, indicated generally at 11, that is composed of a first die section 12 and a second die section 13. The forming die 11 can, for example, be a die that is adapted for use in a hydroforming apparatus. Although this invention will be discussed in terms of hydroforming as the process by which the tube 10 is deformed within the die 11, it will be appreciated that other deforming processes (such as electromagnetic pulse forming, for example) can be used to deform the tube 10 in the die 11. Although the method of this invention will be explained and illustrated in conjunction with the illustrated linearly extending tube 10, it will be appreciated that this invention may be practiced with a tube that has been pre-bent, such as in a conventional tube bending apparatus, to have one or more bends therein or that has otherwise been pre-formed in any other known manner.

The length of the illustrated tube 10 is somewhat greater than the length of the hydroforming die 11. Thus, end portions 14 of the tube 10 extend outwardly from the opposed ends of the hydroforming die 11. The end portions 14 are adapted to be engaged by respective end feed cylinders (not shown) of a hydroforming apparatus. The end feed cylinders are conventional in the art and are adapted to seal against the respective end portions 14 of the tube 10 and to conduct pressurized fluid into the interior of the tube 10 in a manner described further below. The end feed cylinders are also adapted to exert inwardly directed forces on the end portions 14 of the tube 10 during the hydroforming operation, as will also be described further below.

The die sections 12 and 13 have respective cavity portions 12a, 12b and 13a, 13b formed therein that cooperate to form a hydroforming die cavity when the die sections 12 and 13 are moved into engagement with one another as shown. The inner surface of the die cavity of the hydroforming die 11 preferably corresponds in cross sectional shape to the desired shape for the tube 10 throughout some or all of the length thereof after the hydroforming operation has been performed. Thus, the inner surface of the die cavity of the hydroforming die 11 may be formed having any desired shape for the tube 10. The cavity portions 12a, 12b and 13a, 13b are preferably formed relatively near to the end portions 14 of the tube 10, for a reason that will be explained below. The perimeters of the cavity portions of the hydroforming die 11 are somewhat larger than the perimeter of the associated portions tube 10 extending therethrough. As will be explained in detail below, the perimeter of the tube 10 will be increased within these enlarged cavity portions of the hydroforming die 11 during the hydroforming operation.

Figure 2:
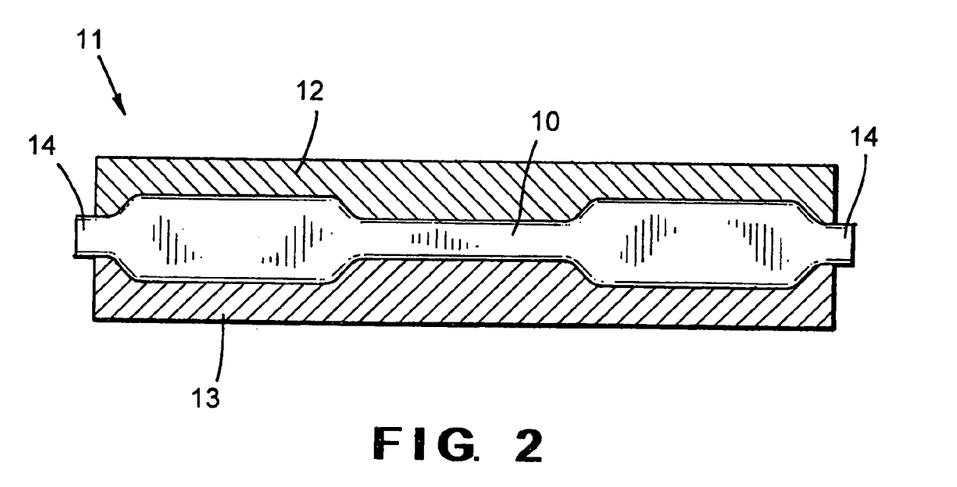
FIG. 2 is a sectional elevational view of the closed channel structural member and the hydroforming die illustrated in FIG. 1 after the completion of the hydroforming operation.

The hydroforming operation is, of itself, conventional in the art and uses pressurized fluid to deform and expand the tube 10 into conformance with the die cavity of the hydroforming die 11. To accomplish this, the end portions 14 of the tube 10 are initially engaged by the end feed cylinders. Then, the tube 10 is filled with a pressurized fluid, typically a relatively incompressible liquid such as water. The pressure of the fluid is increased to a magnitude where the tube 10 is deformed outwardly into conformance with the die cavity. At the same time, the end feed cylinders may, if desired, be operated to exert inwardly directed forces against the end portions 14 of the tube 10. As a result, the tube 10 is deformed into the shape illustrated in FIG. 2, wherein the tube 10 corresponds with the inner surface of the die cavity of the hydroforming die 11. In the regions of the two enlarged cavity portions, the wall thickness of the tube 10 is reduced somewhat. However, the end feeding process causes some of the end portions 14 of the tube 10 to be moved inwardly within the hydroforming die 11 by the end feed cylinders. As a result, the amount of such wall thickness reduction is minimized when the end feeding process performed. It will be appreciated that any conventional apparatus may be used to perform the hydroforming operation.

Figure 3:
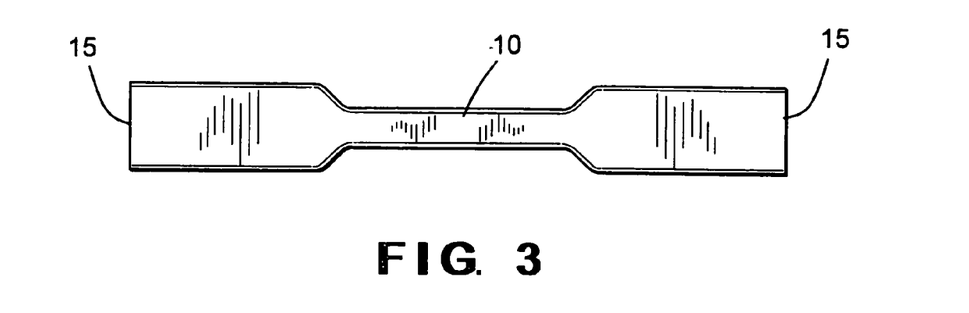
FIG. 3 is a sectional elevational view of the closed channel structural member illustrated in FIG. 1 after having been removed from the hydroforming die and after having the end portions trimmed off.

Following the hydroforming operation, the tube 10 is removed from the hydroforming die 11. Then, the end portions 14 of the tube 10 are removed in any conventional manner, such as by cutting, to provide a truncated tube 10, as shown in FIG. 3. The truncated tube 10 is characterized by a relatively small dimension central portion extending between a pair of relatively large dimension end portions. The end portions terminate in respective relatively large end surfaces 15. As will become apparent below, it is preferable that the two relatively large end surfaces 15 be comparable in size and shape, although such is not required.

Figure 4:
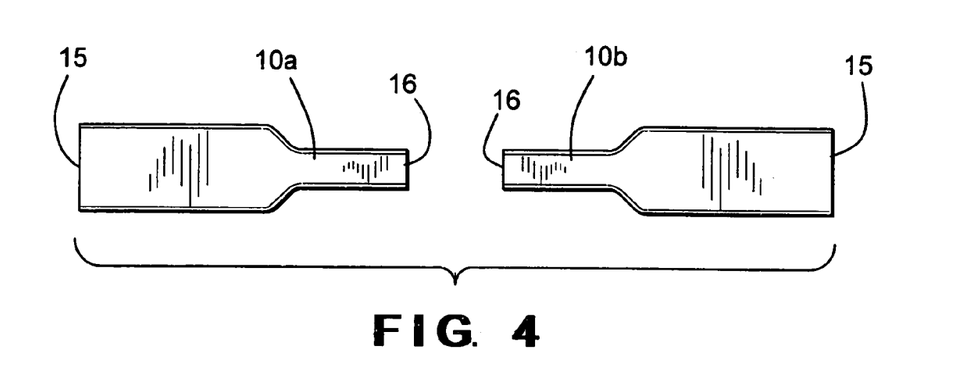
FIG. 4 is a sectional elevational view of the closed channel structural member illustrated in FIG. 3 after having been cut into two sections.
Figure 5:
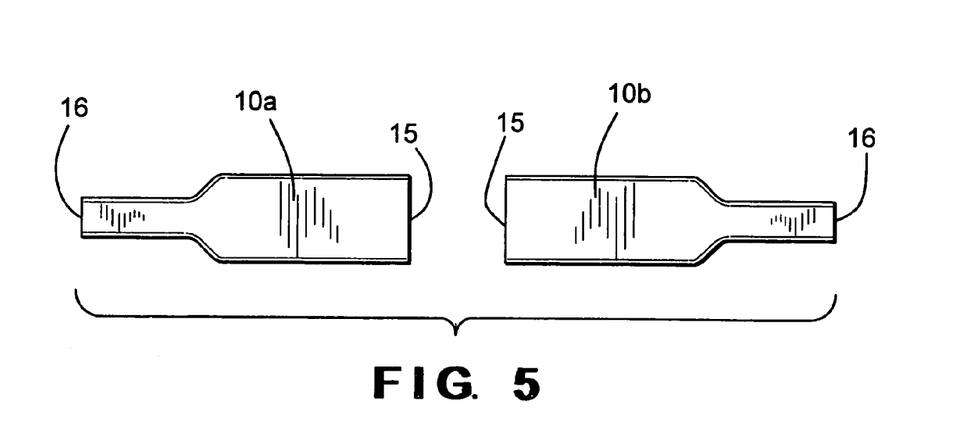
FIG. 5 is a sectional elevational view of the two sections illustrated in FIG. 4 after having been reversed in orientation.

Next, as shown in FIG. 4, the tube 10 is divided into two pieces in any conventional manner, such as by cutting, to provide two tube sections 10a and 10b. In the illustrated embodiment, the two tube sections 10a and 10b are formed by cutting through the relatively small dimension central portion of the tube 10. However, the tube 10 may be cut or otherwise divided at any desired location. After the tube 10 has been divided in this manner, each of the two tube sections 10a and 10b terminates in a relatively small end surface 16 that is opposite the associated relatively large end surface 15. Each of the two tube sections 10a and 10b is then oriented in the opposite direction such that the two relative large end surfaces 15 are disposed adjacent to one another, as shown in FIG. 5.

Figure 6:
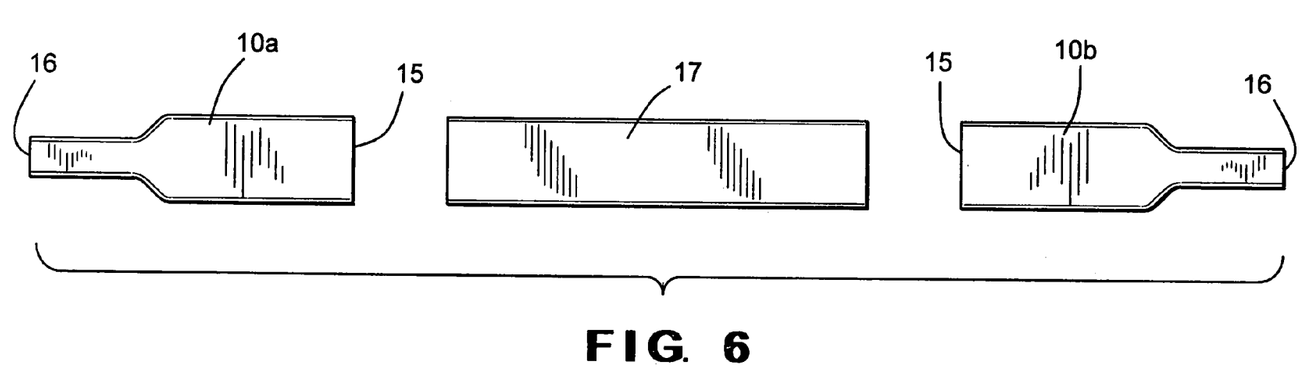
FIG. 6 is a sectional elevational view of the two sections illustrated in FIG. 5 having an intermediate member disposed therebetween.

Next, as shown in FIG. 6, an intermediate member 17 is disposed between the relatively large end surfaces 15 of the two tube sections 10a and 10b. Preferably, the intermediate member 17 is sized approximately the same as the sizes of the relatively large end surfaces 15 of the two tube sections 10a and 10b. However, the intermediate member 17 may be formed having any desired size and shape. Also, the intermediate member 17 is preferably formed from a single closed channel structural member, similar to the two tube sections 10a and 10b. However, the intermediate member 17 may be formed from multiple pieces, and some or all of such pieces may be formed from open channel structural members.

Figure 7:
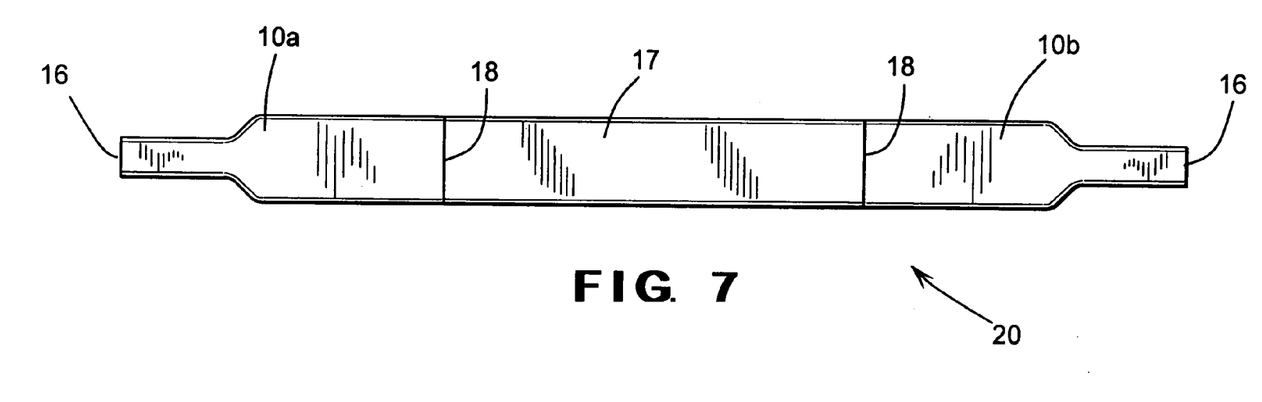
FIG. 7 is a sectional elevational view of the two sections and the intermediate member illustrated in FIG. 6 after having been secured together to form a side rail.
Figure 8:
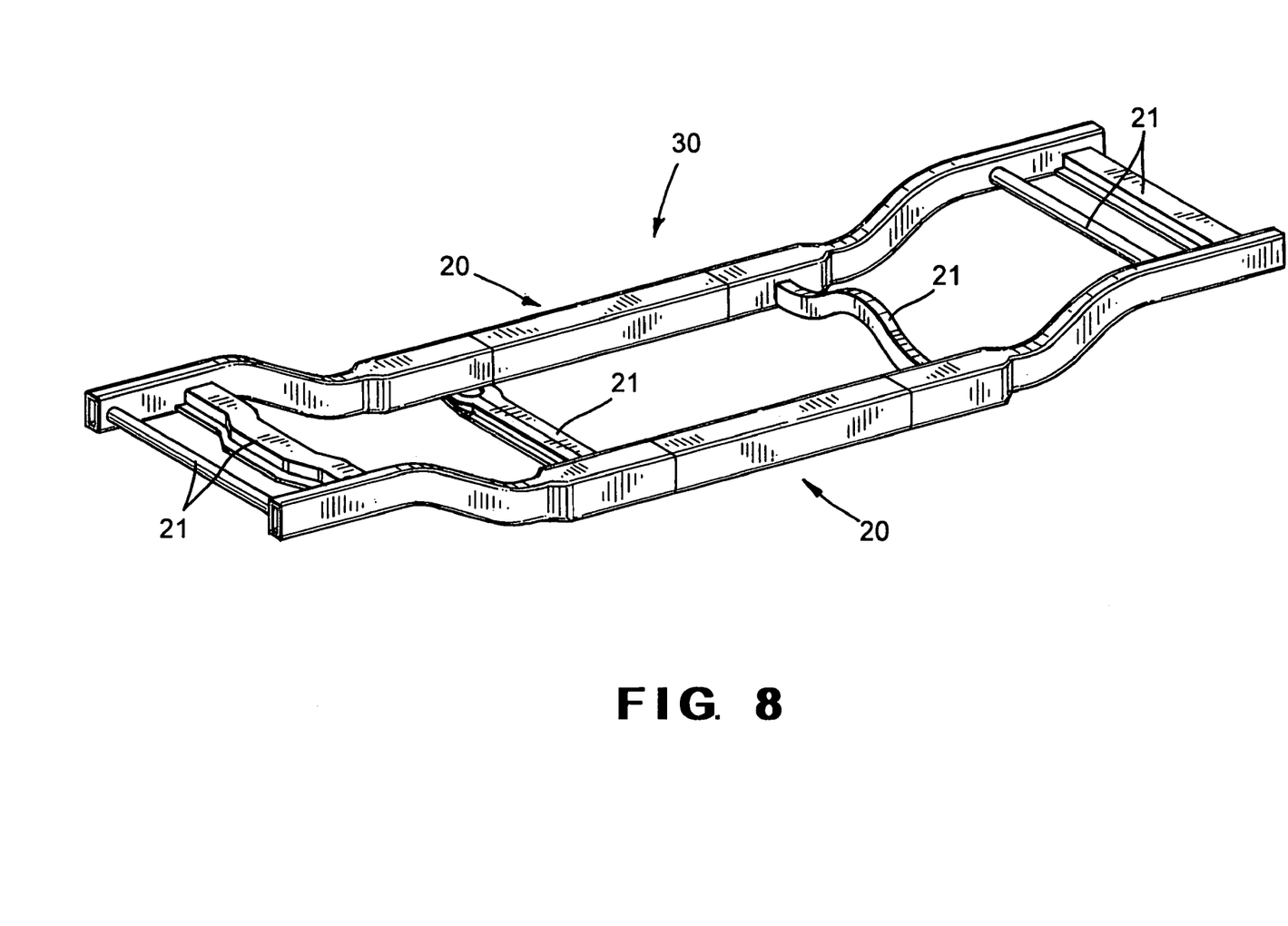
FIG. 8 is a perspective view of a vehicle body and frame assembly including a pair of side rails manufactured in accordance with the method illustrated in FIGS. 1 through 7.

Lastly, the ends of the intermediate member 17 are secured to the two relatively large end surfaces 15 in any conventional manner, such as by butt welding as shown at 18 in FIG. 7, to form a unitary member, indicated generally at 20. As mentioned above, such joining can be facilitated by forming the two relatively large end surfaces 15 to be comparable in size and shape to the ends of the intermediate member 17. The resultant unitary member 20 can be characterized by a relatively large dimension central portion extending between a pair of relatively small dimension end portions, although the relative sizes of the various portions of the unitary member 20 can be varied as desired. The unitary member 20 can, for example, be used as a component of a vehicle body and frame assembly. FIG. 8 illustrates one example of a vehicle body and frame assembly, indicated generally at 30, wherein two of such unitary members 20 are provided as side rails in a ladder type frame assembly having a plurality of cross members 21 extending therebetween. It will be appreciated that the unitary member 20 can be sized and shaped for use as any type of vehicle frame component in any type of vehicle body and frame assembly.

Thus, it will be appreciated that in accordance with the method of this invention, the tube 10 is initially deformed to have a relatively small dimension central portion extending between a pair of relatively large dimension end portions. Thereafter, the deformed tube 10 is cut into two pieces, reversed in orientation, and secured to an intermediate member 17 such that the final unitary member 20 has a relatively large dimension central portion extending between a pair of relatively small dimension end portions. This method allows the initial hydroforming expansion process to occur at the outermost ends of the tube 10, where it can be performed most conveniently with a minimum amount of reduction in wall thickness. Specifically, the initial hydroforming expansion occurs at locations on the tube 10 where the end feeding process has been found to function most satisfactorily. Such end feeding would, as discussed above, be much more difficult if it were attempted to form the unitary member 20 directly. This is because it is difficult to perform the end feeding process effectively when the interior portion being expanded is located relatively far from the ends portions, when the overall length of the closed channel structural member is relatively long, and when the shape of the closed channel structural member is not relatively straight.

Figure 9:
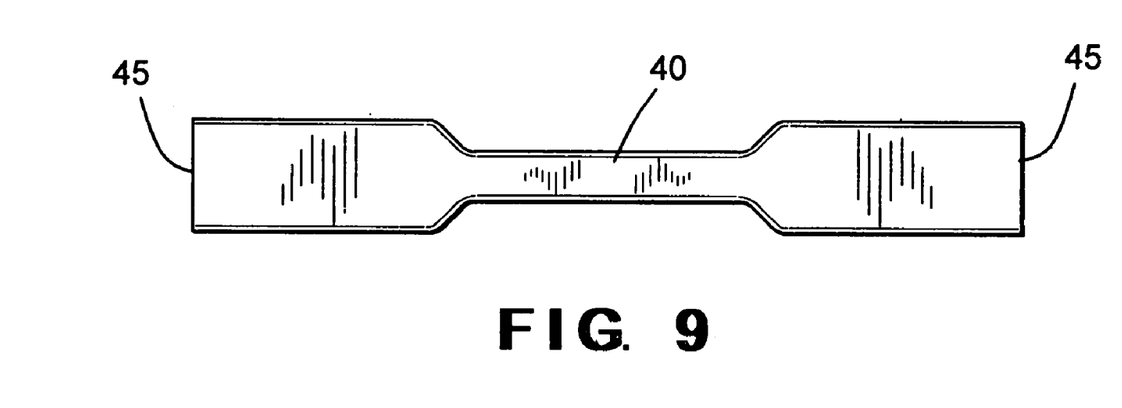
FIG. 9 is a sectional elevational view similar to FIG. 3 showing a closed channel structural member after having been removed from the hydroforming die and after having the end portions trimmed off in accordance with a second embodiment of the method of this invention.

Referring now to FIG. 9, there is illustrated a closed channel structural member 40 that can be formed in the same manner and that can have the same structure as the closed channel structural member 10 described above. Thus, the truncated tube 40 is characterized by a relatively small dimension central portion extending between a pair of relatively large dimension end portions. The end portions terminate in respective relatively large end surfaces 45. The two relatively large end surfaces 45 can be comparable in size and shape, although such is not required.

Figure 10:
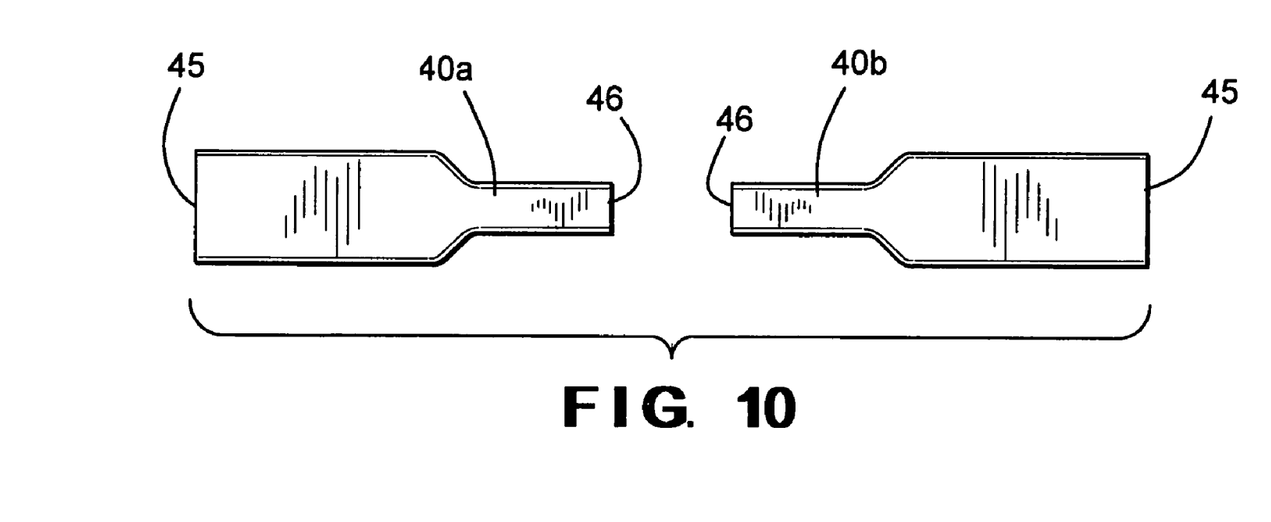
FIG. 10 is a sectional elevational view of the closed channel structural member illustrated in FIG. 9 after having been cut into two sections.

Next, as shown in FIG. 10, the tube 40 is divided into two pieces in any conventional manner, such as by cutting, to provide two tube sections 40a and 40b. In the illustrated embodiment, the two tube sections 40a and 40b are formed by cutting through the relatively small dimension central portion of the tube 40. However, the tube 40 may be cut or otherwise divided at any desired location. After the tube 40 has been divided in this manner, each of the two tube sections 40a and 40b terminates in a relatively small end surface 46 that is opposite the associated relatively large end surface 45.

Figure 11:
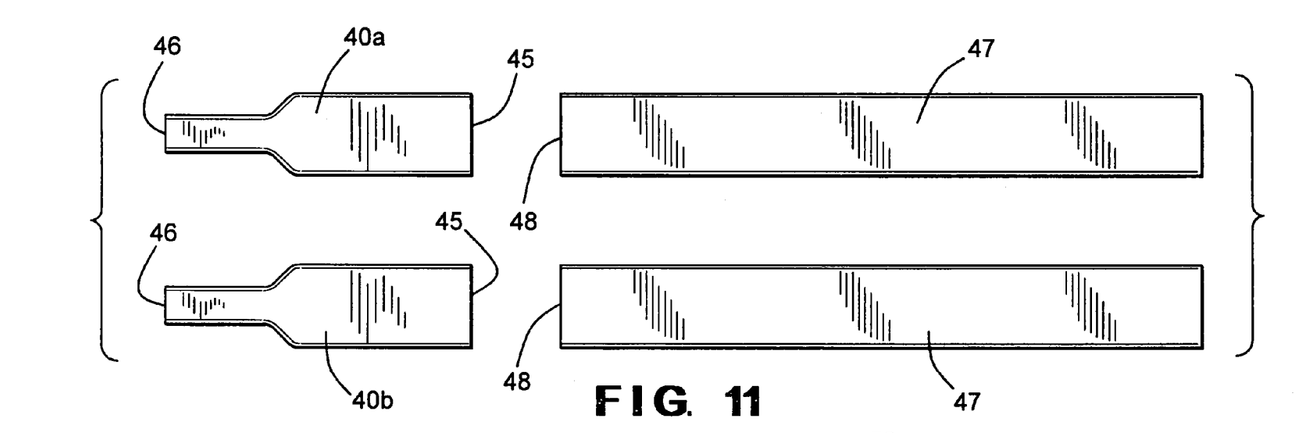
FIG. 11 is a sectional elevational view of the two sections illustrated in FIG. 10 having respective end members aligned therewith.

Next, as shown in FIG. 11, an end member 47 is aligned with each of the two tube sections 40a and 40b such that end surfaces 48 of the end members 47 are disposed adjacent to the relatively large end surfaces 45 of the two tube sections 40a and 40b. Preferably, the end surfaces 48 of each of the end members 47 are sized approximately the same as the sizes of the relatively large end surfaces 45 of the respective two tube sections 40a and 40b, as shown in FIG. 11. However, the end surfaces 48 and the end members 47 themselves may be formed having any desired sizes and shapes. The end members 47 may be formed from a single closed channel structural member. However, the end members 47 may each be formed from multiple pieces, and some or all of such pieces may be formed from open channel structural members.

Figure 12:
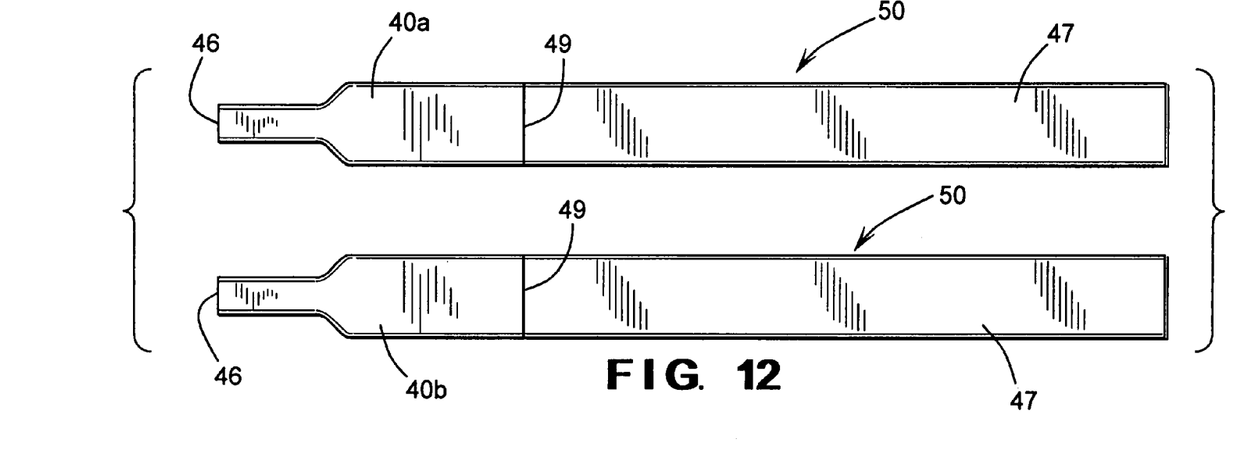
FIG. 12 is a sectional elevational view of the two sections and their respective end members illustrated in FIG. 11 after having been secured together to form a pair of side rails.
Figure 13:
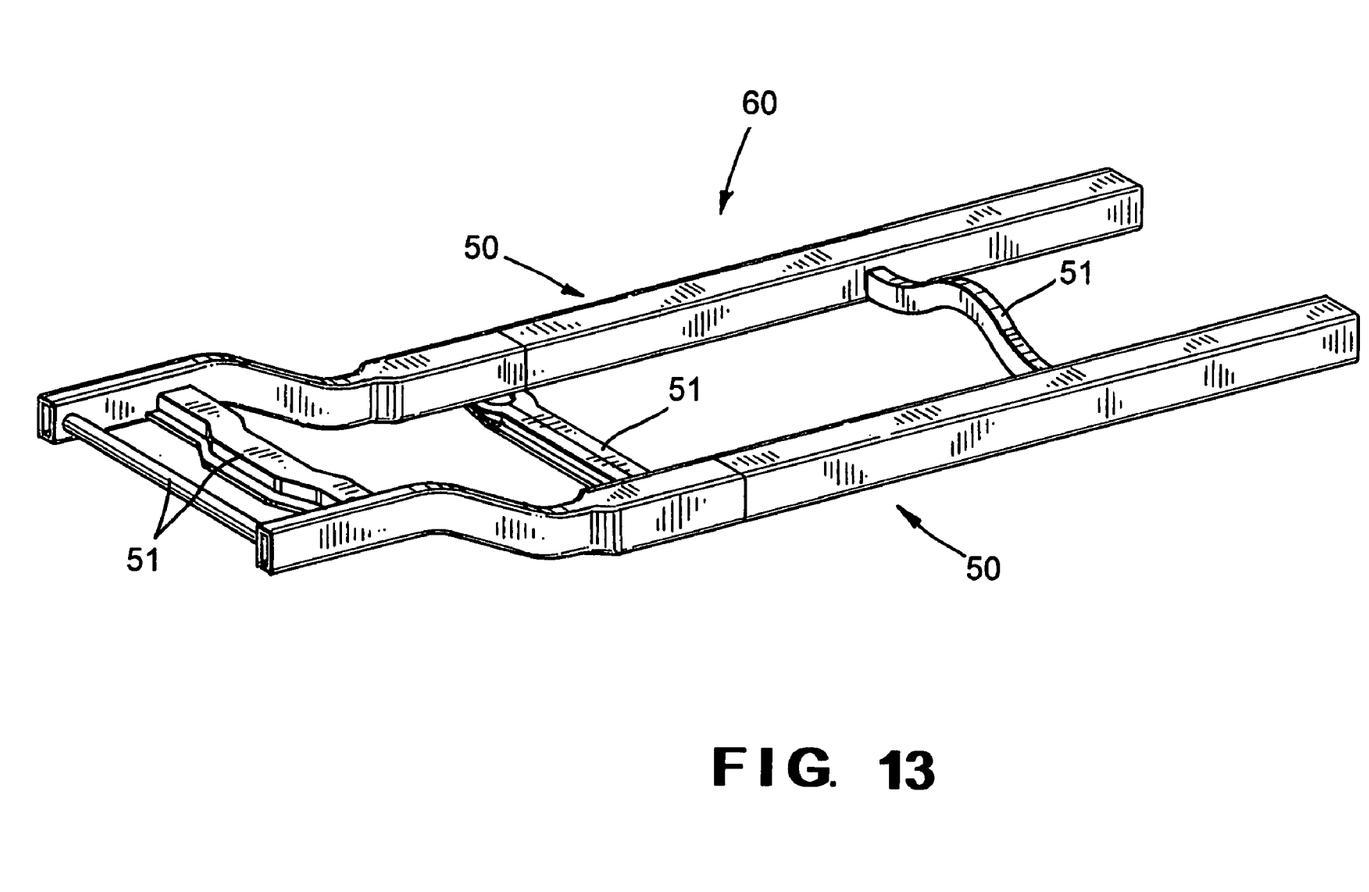
FIG. 13 is a perspective view of a vehicle body and frame assembly including a pair of side rails manufactured in accordance with the method illustrated in FIGS. 9 through 12.

Lastly, the end surfaces 48 of the end members 47 are respectively secured to the two relatively large end surfaces 45 in any conventional manner, such as by butt welding as shown at 49 in FIG. 12, to form a pair of unitary members, indicated generally at 50. As mentioned above, such joining can be facilitated by forming the two relatively large end surfaces 45 to be comparable in size and shape to the relatively large end surfaces of the end members 47. The resultant unitary member 50 can be characterized by a relatively small dimension first end portion and a relatively large dimension second end portion, although the relative sizes of the various portions of the unitary member 50 can be varied as desired. The unitary member 50 can, for example, be used as a component of a vehicle body and frame assembly. FIG. 13 illustrates one example of a vehicle body and frame assembly, indicated generally at 60, wherein two of such unitary members 50 are provided as side rails in a ladder type frame assembly having a plurality of cross members 51 extending therebetween. It will be appreciated that the unitary member 50 can be sized and shaped for use as any type of vehicle frame component in any type of vehicle body and frame assembly.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of manufacturing a vehicle frame assembly comprising the steps of:
   (a) forming a first vehicle frame component by:
       (1) providing a closed channel structural member;
       (2) deforming the closed channel structural member to have a relatively small end portion and a relatively large end portion;
       (3) providing a member having first and second ends and that is sized approximately the same as the size of the relatively large end portion of the closed channel structural member; and
       (4) securing the relatively large end portion of the closed channel structural member to the first end portion of the member to form the first vehicle frame component;
   (b) providing a plurality of second vehicle frame components; and
   (c) securing the first vehicle frame component and the plurality of second vehicle frame components together to form the vehicle frame assembly.

2. The method defined in claim 1 wherein said step of deforming the closed channel structural member is performed by hydroforming.

3. A method of manufacturing a vehicle frame assembly comprising the steps of:
   (a) forming first and second vehicle frame components by:
       (1) providing a closed channel structural member;
       (2) deforming the closed channel structural member to have a relatively small central portion and first and second relatively large end portions;
       (3) dividing the closed channel structural member to provide a first section including the first relatively large end portion and a second section including the second relatively large end portion;
       (4) providing a first member having first and second ends and that is sized approximately the same as the size of the first relatively large end portion of the first section;

(5) securing the first relatively large end portion of the first section to the first end portion of the first member to form the first vehicle frame component;
(6) providing a second member having first and second ends and that is sized approximately the same as the size of the second relatively large end portion of the second section; and
(7) securing the second relatively large end portion of the second section to the first end portion of the second member to form the second vehicle frame component;

(b) providing a plurality of second vehicle frame components; and (c) securing the first vehicle frame component and the plurality of second vehicle frame components together to form the vehicle frame assembly.

4. The method defined in claim 3 wherein said step of deforming the closed channel structural member is performed by hydroforming.

5. The method defined in claim 3 wherein said step of dividing the closed channel structural member is performed by dividing the relatively small central portion of the closed channel structural member.

* * * * *